US011137119B2

(12) United States Patent
Tao et al.

(10) Patent No.: US 11,137,119 B2
(45) Date of Patent: Oct. 5, 2021

(54) TUBULAR DEVICE FOR FITTING TO A TUBULAR LIGHT FITTING

(71) Applicant: SIGNIFY HOLDING B.V., Eindhoven (NL)

(72) Inventors: Haimin Tao, Eindhoven (NL); Tian Xiang Wen, Shanghai (CN); Feng Ju, Eindhoven (NL); Frits Tobi De Jongh, Beek en Donk (NL); Han Lu, Eindhoven (NL); Pieter Johannes Stobbelaar, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/096,231

(22) PCT Filed: May 8, 2017

(86) PCT No.: PCT/EP2017/060917
§ 371 (c)(1),
(2) Date: Oct. 24, 2018

(87) PCT Pub. No.: WO2017/194468
PCT Pub. Date: Nov. 16, 2017

(65) Prior Publication Data
US 2019/0154246 A1 May 23, 2019

(30) Foreign Application Priority Data

May 12, 2016 (CN) .................. PCT/CN2016/081899
Jun. 3, 2016 (EP) ..................................... 16172791

(51) Int. Cl.
*F21V 25/04* (2006.01)
*H05B 45/37* (2020.01)
(Continued)

(52) U.S. Cl.
CPC ............ *F21K 9/278* (2016.08); *F21V 23/003* (2013.01); *F21V 23/06* (2013.01); *F21V 25/04* (2013.01);
(Continued)

(58) Field of Classification Search
CPC combination set(s) only.
See application file for complete search history.

(56) References Cited

U.S. PATENT DOCUMENTS 9,338,854 B1 * 5/2016 Duan ................. H05B 45/3578
2004/0124787 A1 * 7/2004 Yang ................. H05B 41/2325
315/291

(Continued)

FOREIGN PATENT DOCUMENTS

CN 201781665 U 3/2011
CN 102421231 A 4/2012
(Continued)

*Primary Examiner* — Amy Cohen Johnson
*Assistant Examiner* — Syed M Kaiser
(74) *Attorney, Agent, or Firm* — Daniel J. Piotrowski

(57) ABSTRACT

A tubular solid state lighting device has a pin safety circuit electrically connected to connection pins of the one end. The pin safety circuit comprises two protection components, of different types. In one set of examples, there is an electrically controlled isolation switch and an electronic switch which functions as a high voltage isolation barrier. The switch provides full galvanic contact separation, whereas the isolation barrier provides current protection if the isolation switch is not functional. In another set of examples, there is a mechanically controlled isolation switch and an electrical or electronic isolation barrier. This provides two levels of protection, but requiring only a single manual operation by the installer of the lighting device. It avoids end-of-life protection circuitry being triggered during the installation of the lighting device.

9 Claims, 8 Drawing Sheets

(51) Int. Cl.
*F21V 23/00* (2015.01)
*F21Y 115/10* (2016.01)
*F21K 9/278* (2016.01)
*H05B 45/382* (2020.01)
*F21V 23/06* (2006.01)
*F21Y 103/10* (2016.01)

(52) U.S. Cl.
CPC ........ *H05B 45/382* (2020.01); *F21Y 2103/10* (2016.08); *F21Y 2115/10* (2016.08); *Y02B 20/30* (2013.01)

(56) References Cited

U.S. PATENT DOCUMENTS

| | | | | |
|---|---|---|---|---|
| 2007/0029943 | A1* | 2/2007 | Erhardt | H05B 41/2985 315/209 R |
| 2007/0205729 | A1* | 9/2007 | Garbowicz | H05B 41/46 315/299 |
| 2011/0082599 | A1* | 4/2011 | Shinde | H02J 13/0003 700/295 |
| 2011/0149564 | A1 | 6/2011 | Hsia et al. | |
| 2013/0147350 | A1 | 6/2013 | Yang | |
| 2013/0221867 | A1* | 8/2013 | Deppe | H05B 45/3725 315/224 |
| 2013/0335959 | A1 | 12/2013 | Hsia | |
| 2013/0342128 | A1* | 12/2013 | Chen | H05B 45/37 315/228 |
| 2014/0055029 | A1* | 2/2014 | Jans | F21K 9/27 315/74 |
| 2014/0265900 | A1* | 9/2014 | Sadwick | H05B 45/395 315/200 R |
| 2014/0300274 | A1* | 10/2014 | Acatrinei | F21K 9/232 315/85 |
| 2015/0061520 | A1* | 3/2015 | Tao | H05B 47/10 315/200 R |
| 2016/0081147 | A1* | 3/2016 | Guang | H05B 45/3578 315/123 |
| 2016/0109070 | A1* | 4/2016 | Davenport | H05B 45/3725 362/221 |
| 2016/0120002 | A1* | 4/2016 | Tousain | H05B 45/3725 315/121 |
| 2016/0174308 | A1* | 6/2016 | Tao | H05B 45/00 315/52 |
| 2017/0105263 | A1* | 4/2017 | Xiong | F21K 9/275 |
| 2017/0105265 | A1* | 4/2017 | Sadwick | F21K 9/232 |
| 2017/0257928 | A1* | 9/2017 | Hsia | G05F 1/10 |
| 2018/0063906 | A1* | 3/2018 | Tao | H05B 45/44 |
| 2019/0032864 | A1* | 1/2019 | Xiong | F21V 25/04 |
| 2019/0041008 | A1* | 2/2019 | Xiong | H05K 1/00 |
| 2019/0154246 | A1* | 5/2019 | Tao | H05B 33/0809 |

FOREIGN PATENT DOCUMENTS

| | | | | |
|---|---|---|---|---|
| CN | 102707828 | A | 10/2012 | |
| CN | 103459921 | A | 12/2013 | |
| CN | 104812122 | * | 7/2015 | ............ H05B 37/02 |
| CN | 104812122 | A | 7/2015 | |
| CN | 205124059 | U | 3/2016 | |
| KR | 20090098451 | A | 9/2009 | |
| KR | 1020150031541 | A | 3/2015 | |
| WO | 2013000106 | A1 | 1/2013 | |
| WO | 2015028329 | A1 | 3/2015 | |
| WO | 2015028639 | A1 | 3/2015 | |
| WO | 2015066566 | A1 | 5/2015 | |
| WO | 2015142042 | A1 | 9/2015 | |
| WO | 2016005344 | A1 | 1/2016 | |

* cited by examiner

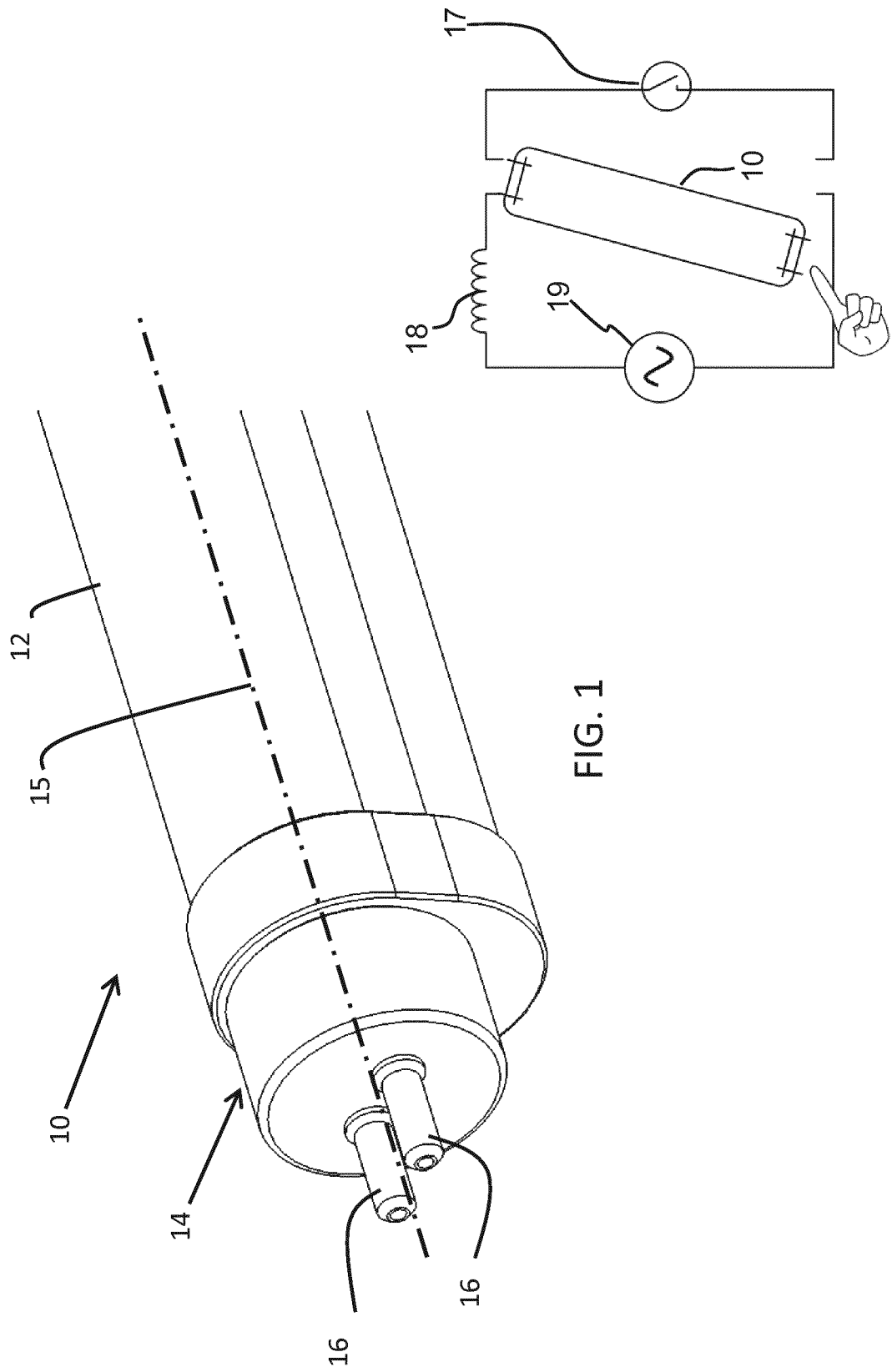

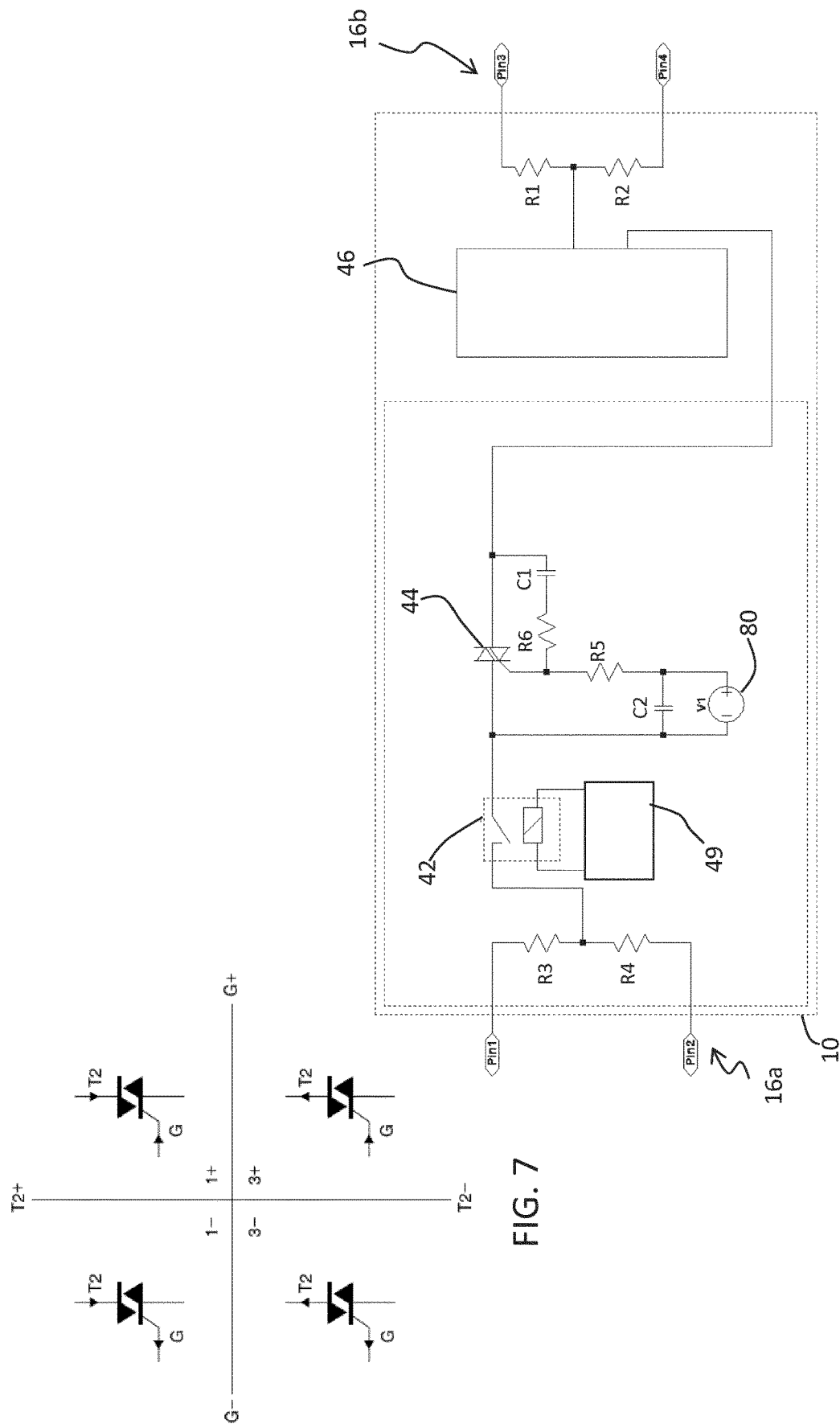

TUBULAR DEVICE FOR FITTING TO A TUBULAR LIGHT FITTING

CROSS-REFERENCE TO PRIOR APPLICATIONS

This application is the U.S. National Phase application under 35 U.S.C. § 371 of International Application No. PCT/EP2017/060917, filed on May 8, 2017 which claims the benefit of Chinese Patent Application No. PCT/CN2016/081899, filed on May 12, 2016 and European Patent Application 16172791.2, filed on Jun. 3, 2016. These applications are hereby incorporated by reference herein.

FIELD OF THE INVENTION

This invention relates to tubular light fittings, and in particular to the tubular lighting devices which are received in such fittings.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with electronic ballasts for fluorescent light tubes. The ballast circuit is external of the light tube, and in the case of a magnetic ballast comprises a ballast (inductor) and a starter circuit. The ballast, starter circuit and the two pairs of connection pins from a closed circuit. In a conventional fluorescent light tube, a heating filament between the connection pins of each pair completes the circuit. Electronic ballasts do not require a separate starter.

There are now tubular LED ("TLED") solid state lamps which can be used as a direct replacement for traditional fluorescent light tubes. In this way, the advantages of solid state lighting can be obtained without the expense of changing existing light fittings.

FIG. 1 shows one example of a basic known tubular solid state lamp 10, comprising a tubular housing 12 having an end cap 14 at each end (only one is shown). FIG. 1 shows a non-circular tube simply to illustrate that tubular LEDs are not limited to the circular profiles of conventional fluorescent tubes, but of course circular tubular LEDs are equally well known. The end cap 14 carries external connectors 16 in the form of two pins offset to each side from a central axis of the end cap 14, parallel to an elongate axis 15 of the tubular housing 12. The end cap 14 connects electrically to the internal driver board and the circuit board which mounts the solid state lighting elements, for example LEDs, inside the tubular housing 12.

FIG. 2 shows the basic circuit of a standard fluorescent light tube luminaire. It comprises a glow starter 17, ballast 18 and the mains AC source 19. Together with filament wires bridging the pairs of contact pins at each end of the tube 10, a closed circuit is formed. A basic electromagnetic (EM) ballast such as shown in FIG. 2 may operate at mains frequency, whereas an electronic ballast has electronic components to operate at a high frequency, such as 20 kHz.

FIG. 2 illustrates how it is safe to touch the non-connected end of the tube for a fluorescent light tube. A conventional fluorescent light tube can be inserted into such a live mains fixture without any danger because the connection pins on either side of the lamp are electrically insulated from each other by the glass tube of the lamp and the gas inside it. An electrical contact between the two ends of the lamp is only established if the gas inside it is ignited and this is only possible after both ends of the lamp have been inserted into the luminaire.

Taking the lamp out of the luminaire will immediately stop both the current flowing through it and the gas discharge in it and thus immediately re-establish electrical insulation between both ends of the lamp.

However, inserting a TLED lamp into a luminaire is potentially dangerous since it is possible to touch the connection pins on one end of the lamp whilst the other end of the lamp is already inserted and in contact with a hazardous voltage.

A typical TLED retrofit lamp contains LED PCBs and LED driver PCBs which offer little electrical insulation between the connection pins on both ends of the TLED. It may therefore be dangerous to insert such a TLED into a live mains fixture because there is a conductive path between the two ends of the tube.

Various pin safety measures have been proposed to overcome this safety issue. These pin safety measures usually interrupt the electrical connection between both ends of the TLED by at least one switch that is only closed when both ends of the TLED are inserted into the luminaire.

Both electrical and mechanical pin safety mechanisms are known.

In one known electrical pin safety solution, power is only taken from a first side of the tube and the other side is isolated from the first, and is arranged as a short between the two pin connections on that other side. The glow starter 17 (FIG. 2) has to be replaced by a dummy starter with a bridging wire or a fuse inside, so that the loop for the current is closed. This method has its limitations since it only works with lighting fixtures which contain a starter (FIG. 2). For example, for electronic ballast fixtures there are no starters in the circuit and therefore the dummy starter method does not work. For electronic ballast fixtures, and for some other types of ballast, other pin safety solutions are required.

For example, in some other electrical pin safety solutions, an electromagnetic relay is closed when both ends of the TLED are inserted into the lamp holders in the luminaire. The relay remains open when only one end is inserted. Insertion of the TLED into the luminaire is detected and the electromagnetic relay is closed using currents and voltages originating from the electronic ballast. An advantage of the relay pin safety solution is that it is fool-proof and maintains the look and feel of a normal lamp.

One issue with the use of relays is that they are prone to failure due to the moving parts (the contacts) and arcing damage. One of the often-seen failure modes is a short failure of the open contact. If this happens, there is no longer any pin safety protection.

One solution to this problem is to use two relays as shown in FIG. 3. First and second relays 30, 32 are in series with a shared relay coil supply circuit 34, between the pins 16a at one end and the LED driver and load, shown together as 36. FIG. 3 also shows filament emulation circuits 38 associated with each set 16a, 16b of pins. The relay coil supply circuit implements fault detection. When one of the relays 30, 32 fails into a shorted mode, the other will no longer switch to provide safety (the lamp will also not light up anymore). However this solution is relatively expensive and large in size as a result of the need for two relays.

In mechanical pin safety solutions, at each end of the TLED a switch is closed when pressing a button or operating a slider or other mechanical input. Either the lamp holder will push the button when inserting the TLED into the luminaire or it needs to be pressed manually. This can be used for all types of ballasts, but it changes the way the TLED has to be installed, and it may not be compatible with all different luminaire and socket mechanical designs, since this depends on the button design and the luminaire and socket design.

A mechanical switch design must not be able to be activated by accident. This is for example achieved by designing the mechanical switch in such way that the activation requires a two-step approach. A first step is activation of an insertion detection button (for example by inserting the lamp into the luminaire), and a second step is operation of a switch by a manual user action. In this way, after installation into the luminaire, the lamp pins are connected to the high frequency electronic ballast at each end of the lamp, but the current does not initially flow through the lamp from one end to the other end. The current is only able to flow after activation of the manual switch by the user.

Many high frequency electronic ballast designs include a protection circuit that prevents an electrical current from flowing in case the (fluorescent) tubular lamp has reached its end-of-life. This protection circuit prevents the high frequency electronic ballast from overheating in the end-of-life situation. The end-of-life protection is typically activated by detecting whether the filament between the two pins in one lamp end is intact or broken. A broken filament is the typical root cause for fluorescent tubular lamp end-of-life failure.

Normally, the user does not know whether the high frequency electronic ballast has or has not an end-of-life protection function. A rough estimate is that 70% of the high frequency electronic ballast types globally contain such a protection.

The installation of a TLED lamp with a mechanical pin safety protection as described above will light-up only after activating the manual switch. When a high frequency electronic ballast with end-of-life protection is installed, the electronic ballast will detect the TLED as an end-of-life lamp when the manual switch is not turned on. Typically, the high frequency electronic ballast allows this end-of-life situation for less than 1 second. As the time needed to switch the manual activation switch on the above TLED will typically require more than 1 second, these type of high frequency electronic ballast will activate the protection circuit.

A reset of this protection circuit can be done by hard mains off/on switch. The time between switching off the mains and again switching on the mains is up to 30 seconds. This 30 seconds mains cycle can become an inconvenience when installing lamps with mechanical pin safety solutions.

A first aspect of this invention relates to the need for an improved system for providing fail-safe protection when fitting a TLED to a luminaire but which can be implemented without requiring two (or more) relay components.

A second aspect of this invention relates to the need to enable the use of a mechanical pin safety solution which is more compatible with luminaires having an end-of-life protection function.

US 2015/0061520 discloses a lamp device having a lighting module and two pairs of external connection pins for connecting the lamp device to a supply voltage of a lighting fixture. A first terminal of the lighting module is connected to a pin of a first pair of pins by a switch which is closed in response to a voltage difference between both the pins of the first pair of pins and the pins of the second pair of pins exceeding a respective threshold voltage. The lamp is therefore safe to handle even in a condition where one pair of pins is connected and the other is not.

SUMMARY OF THE INVENTION

The invention is defined by the claims.

Examples in accordance with a first aspect of the invention provide a solid state tubular lighting device, comprising:

a tubular housing having an elongate axis and first and second opposite ends, each end comprising two projecting electrical connection pins;

a rectifier circuit, wherein the pins of the second end are electrically connected to the rectifier circuit;

a lighting driver circuit powered by the output of the rectifier circuit;

a solid state lighting arrangement; and a safety circuit electrically connected to connection pins of the first end, wherein the safety circuit comprises an electrically or mechanically controlled isolation switch providing a clearance distance and an electronic switch.

In this design there is a combination of two isolation devices. One is an electrically or mechanically controlled isolation switch and the other is an electronic switch, which functions as an isolation barrier. The electronic switch is a physically static component which implements electronic switching. The isolation switch and the electronic switch are both high voltage components.

The isolation switch is characterized by near zero leakage current when in its isolation mode. In particular, it comprises physically movable contacts, thereby providing galvanic separation. The electronic switch is preferably a semiconductor component. As it does not comprise physically movable contacts, it can be more compact and lower cost. The electronic switch is switchable between conducting and isolating modes.

This avoids the need for two fully galvanic isolating switching devices. The single isolation switch provides high levels of clearance performance. For example, it may provide at least 1.5 mm of electrode clearance in the open state. The purpose of the electronic switch is to provide a safety function in the event that the isolation switch fails, and it provides additional leakage current protection. It may provide a reduced level of performance but nevertheless provides current limitation and thereby implements a safety function if the isolation switch has failed.

The pins of the first end are preferably electrically connected to the safety circuit through a first filament emulation circuit comprising a series resistor arrangement, and the pins of the second end are electrically connected to the rectifier through a second filament emulation circuit comprising a series resistor arrangement.

In a first set of examples, the isolation switch comprises an electrical relay. This provides full electrical isolation between the pins at the opposite ends of the device.

The electronic switch (functioning as a high voltage isolation barrier) may comprise a thyristor surge suppressor (TSS) between the pins of the first end and the rectifier.

This provides a current limiting function, without a need for an external driver.

The electronic switch may instead comprise a triac between the pins of the first end and the rectifier. This again provides a current limiting function.

The triac may comprise a three or four quadrant triac. These are suitable for AC operation, and may thus be provided on the AC side of the device circuitry, between the pins at the first and the rectifier.

A triac gate control circuit may then be provided which comprises a voltage supply, a gate resistor, and a high frequency detection startup circuit. The startup circuit for example detects a rate of change of voltage to turn the triac on when there is a high frequency voltage (provided by the high frequency electronic ballast) across the triac terminals. This startup voltage across the triac disappears once the triac is turned on.

The voltage supply preferably also provides a relay control voltage.

The electronic switch may instead comprise a thyristor between the rectifier and the LED driver. The thyristor is thus on the DC side of the device circuitry. The thyristor may however be triggered when it detects a high frequency voltage at the input to the rectifier.

In another example, the electronic switch comprises a bidirectional transistor circuit between the pins of the first end and the rectifier.

Examples in accordance with a second example of the invention provide a tubular solid state lighting device, comprising:

a tubular housing having an elongate axis and first and second opposite ends, each end comprising two projecting electrical connection pins;

a rectifier circuit, wherein the pins of the second end are electrically connected to the rectifier circuit;

a lighting driver circuit powered by the output of the rectifier circuit;

a solid state lighting arrangement; and a safety circuit electrically connected to connection pins of the first end, wherein the safety circuit comprises a mechanically actuated isolation switch providing a clearance distance and an electrical or electronic switch.

This device also provides two isolation devices. One is a mechanical galvanic isolation device and the other is an electrical or electronic switch. For a current to flow, the mechanical switch must be activated, but also a high frequency signal must be detected to turn on the electrical or electronic switch. This provides two levels of protection of a safety protection mechanism, but it prevents a delay between the two protection mechanisms so that end-of-life detection will not take place. This arrangement also enable the insertion of the lamp into the luminaire to provide the mechanically actuated switching, and this means the installation of the lamp is not different to a conventional lamp. It does not require a separate second mechanical task to be implemented by the user.

The electrical or electronic switch may comprise a triac or a bidirectional transistor circuit between the pins of the first end and the rectifier. This is an electronic switch. A gate control circuit may then be provided which comprises a high frequency detection startup circuit. This provides closing of the electrical isolation barrier when an electronic ballast signal is detected.

The electrical or electronic switch may comprise a relay between the pins of the first end and the rectifier. This is an electrical switch (with physical separation of contacts, unlike a semiconductor electronic switch).

In all examples above, the solid state lighting arrangement for example comprises an LED arrangement and the lighting driver circuit then comprises an LED driver.

The invention also provides a lighting fixture comprising:
an electronic fluorescent lighting ballast; and
a device as defined above fitted to the fluorescent lighting ballast.

BRIEF DESCRIPTION OF THE DRAWINGS

Examples of the invention will now be described in detail with reference to the accompanying drawings, in which:

FIG. 1 shows a basic known tubular LED lamp;
FIG. 2 shows an example of an electromagnetic ballast;
FIG. 7 shows the four quadrants in which a triac may operate;
FIG. 8 shows a third example of pin safety arrangement.

DETAILED DESCRIPTION OF THE EMBODIMENTS

The invention provides a tubular solid state lighting device having a pin safety circuit electrically connected to connection pins of one end. The pin safety circuit comprises two protection components, of different types. In one set of examples, there is an electrically controlled isolation switch such as a relay and an electronic switch which functions as a high voltage isolation barrier. The isolation switch provides full galvanic contact separation, whereas the isolation barrier provides current protection if the isolation switch is not functional. In another set of examples, there is a mechanically controlled isolation switch and an electrical or electronic isolation barrier. This provides two levels of protection, but requiring only a single manual operation by the installer of the lighting device. It avoids end-of-life protection circuitry being triggered during the installation of the lighting device.

The different examples thus each provide two-level pin safety solutions, and address the problems of the prior art.

Figures 3, 4:
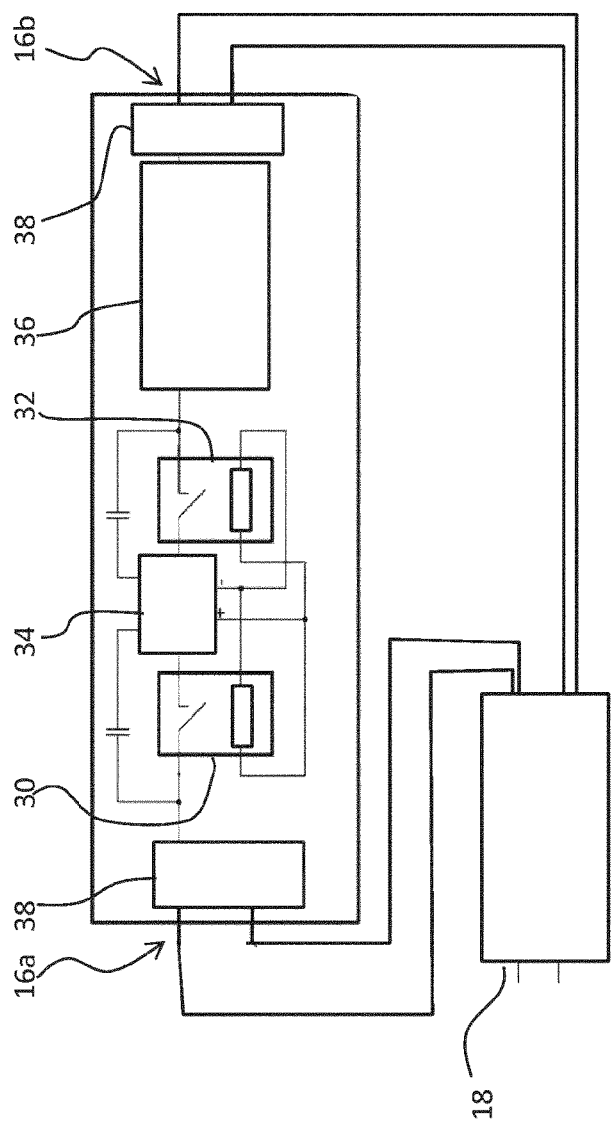
FIG. 3 shows a known pin safety arrangement.
FIG. 4 shows a first example of pin safety arrangement.

FIG. 4 shows a first example of a tubular solid state lighting device 10. A first pair 16a of electrical connection pins is at a first end and a second pair 16b is at a second end.

A safety circuit 40 is electrically connected to the connection pins 16a of the first end, and it comprises an electrically controlled galvanic isolation switch 42 and a high voltage isolation barrier 44. The high voltage isolation barrier in this example is an electronic switch. This example of isolation barrier is a semiconductor component, which has a high resistance mode, but which does not provide galvanic separation of contact terminals. In other examples below, the high voltage isolation barrier may be an electrical switch such as a relay. Note the term "electronic switch" relates to a switch without moving parts, and thus excludes electrical relays, or mechanical switches with physical contact separation.

The first pair 16a of pins connects to the safety circuit 40 by means of a filament emulation circuit in the form of a pair of series resistors R3, R4. The junction between the resistors connects to an input of the safety circuit 40. The output of the safety circuit 40 connects to a first branch (between diodes D3 and D4) of a rectifier circuit 45 which provides a rectified power input to a lighting driver 46, which drives the lighting load 48. The lighting load is typically a string or multiple strings of LEDs. A control circuit 49 provides the electrical control of the isolation switch.

The second pair 16b of pins connects to a second, parallel, branch (between diodes D1 and D2) of the rectifier circuit 45 by means of a filament emulation circuit in the form of a pair of series resistors R1, R2. The junction between the resistors connects to an input of the second branch of the rectifier circuit.

The circuit preferably further comprises a buffer capacitor for smoothing the DC output of the rectifier (shown in some circuit examples below).

The isolation switch 42 comprises an electrically controlled relay in this example, but in other examples below it may be a mechanically controlled relay. The high voltage isolation barrier 44 in the example of FIG. 4 comprises a thyristor surge suppressor (TSS) between the pins of the first end and the rectifier, i.e. on the AC side of the circuitry.

This design provides a two-level safety isolation barrier to meet standardized isolation requirements. The high voltage isolation barrier is for withstanding a high voltage electric field. The circuit is simple and low cost. During steady state, it introduces a low power loss by having a low turn on voltage for the two isolation devices. Before the steady state operation, the isolation barrier provides current limitation, and it is only switched to a steady state (on) mode when both ends of the lighting device are connected.

The driver circuit for the isolation devices may be implemented simply, or indeed no drive circuit may be needed in some examples.

The thyristor surge suppressor (TSS) is a semiconductor device which can withstand high voltages, and does not degrade in surge capability after multiple surge events (within a limit). It is an avalanche triggered component, which switches to a low on-state voltage with high current capability.

Figures 5, 6:
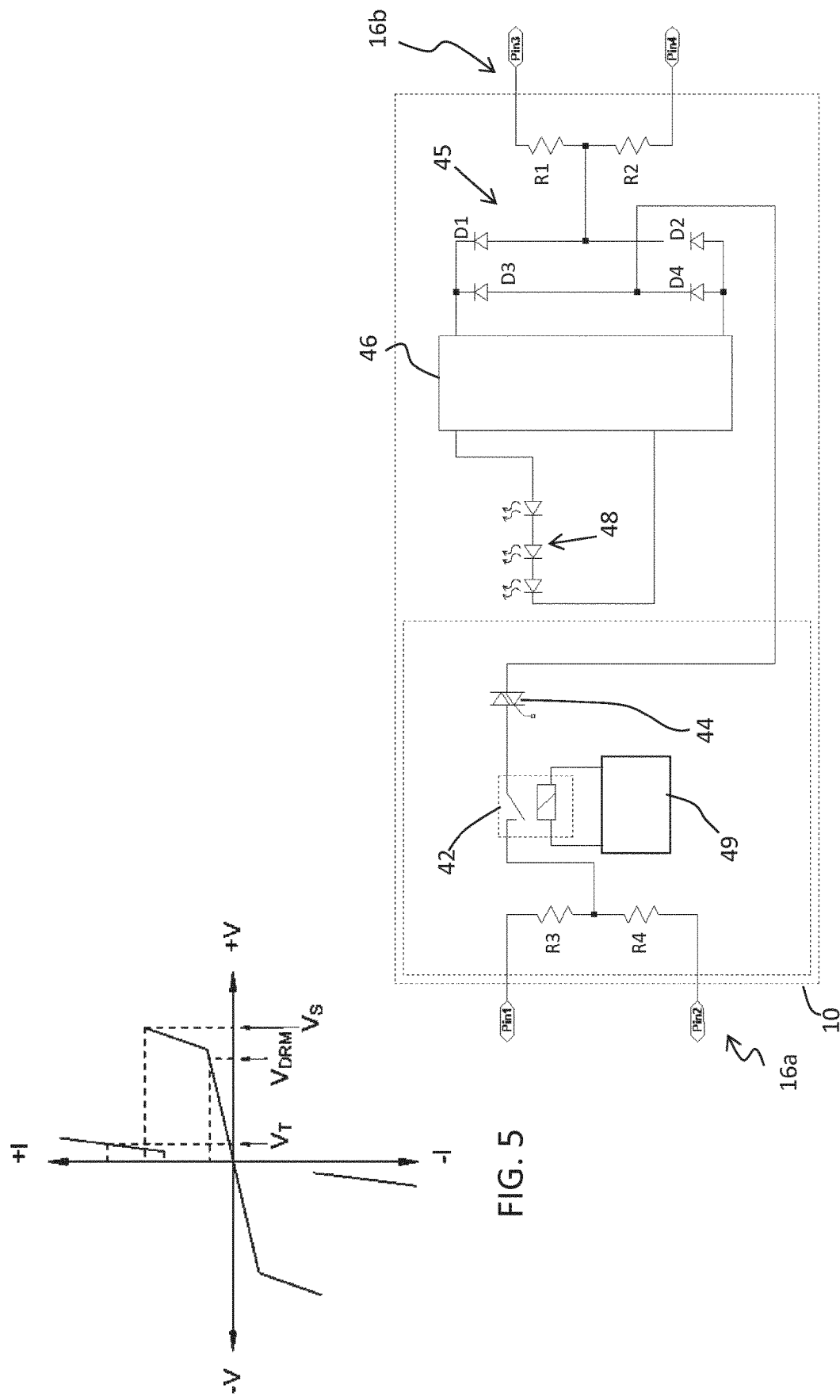
FIG. 5 shows the voltage-current characteristics of the voltage barrier device used in FIG. 4.
FIG. 6 shows a second example of pin safety arrangement.

FIG. 5 shows the current versus voltage behavior. During a startup time, the ballast voltage is shared between the two isolation devices and no current flows to the lighting load. When the high ignition voltage is reached the isolation devices trigger, and lamp operation continues normally. FIG. 5 shows that when the voltage across the device increases beyond a certain threshold, the device breaks down and the terminal voltage collapses to a low level ($V_T$).

The circuit is able to satisfy performance tests. A first is a breakdown test, which requires the device to withstand 1500 V present between the ends of the lamp. A second test is a touch current test, which requires application of a test voltage of 500 V rms (50 Hz or 60 Hz), and the touch current must not exceed 0.7 mA peak.

FIG. 6 shows a second example, in which the high voltage isolation barrier 44 is implemented as a triac. The design thus combines a relay 42 and a triac 44. The relay provides the required galvanic clearance performance, and the triac addresses the risk of failure of the relay contact. The triac limits the pin leakage current in the event that the relay has a shorted failure state, so that the pins are still safe to touch.

The control circuit 49 is provided for the both the relay and the triac. For the triac, the function is to trigger the switch once a high frequency voltage is detected from the electronic (high frequency) ballast. The circuit is otherwise the same as FIG. 4.

There are different types of triac which are available. They are classified in terms of the quadrants they can operate: 2-, 3- and 4-Quadrant.

For instance, a 4-Quadrant Triac can be triggered in any of the 4 quadrants as represented in FIG. 7. Each quadrant is for a different combination of output (terminal 2, T2) and gate (G) voltage polarities relative to the input voltage (applied to terminal 1).

A 3-Quadrant type can only be triggered in quadrants 1, 2 and 3. Since the triac has to conduct an AC current, and a phase relation between the gate and the body current is undefined, the 3-Quadrant and 4-Quadrant triacs are suitable for the pin safety circuit.

An implementation with a 4-Quadrant triac is the most straightforward because the 4-Quadrant triac can be triggered in any of the quadrants with either a positive of negative gate current. A positive gate current is usually easier to arrange than a negative one.

FIG. 8 shows a basic implementation. For clarity only, the rectifier circuit is omitted, and it may for example be assumed to be incorporated into the lighting driver 46.

A voltage source 80 (V1) is a low voltage supply generated by the lamp circuit from the external supply. There is a voltage supply buffer capacitor C2. It provides a control voltage to the relay coil (via control circuit 49) and also provides the gate current to the triac in the steady state. The gate current amplitude is determined by a gate resistor R5.

Furthermore, there is a startup circuit which detects a rate of change of voltage, in order to detect the presence of a high frequency ballast signal. The startup circuit comprises an RC filter circuit (R6, C1) connected across the triac. The function of the RC circuit is to turn the triac on once there is a high frequency voltage across the triac terminals.

The RC circuit will trigger the gate when there is a sufficiently high rate of change of voltage (dv/dt) across the triac. This startup supply voltage disappears once the triac is triggered as there is then no or negligible voltage across the terminals.

When there is only a mains voltage applied to the device from one end to the other, the safety circuit stays in an off mode (because the high frequency ballast signal does not flow with only one end connected) and little current can flow.

Figure 9:
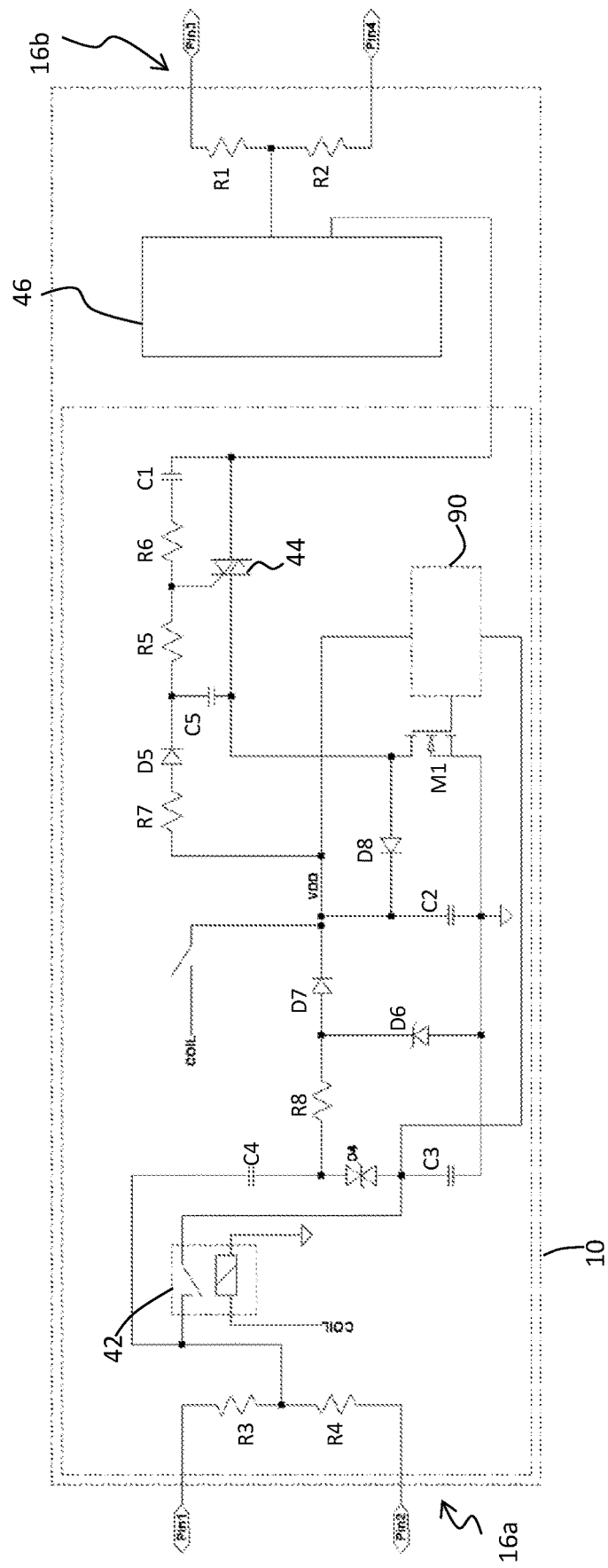
FIG. 9 shows a fourth, more detailed, example of pin safety arrangement.

A more detailed implementation of the circuit is shown in FIG. 9.

A transistor M1 and diode D8 form a shunt switch circuit which regulates the low voltage supply VDD in the steady state. The transistor is controlled by a gate control circuit 90. The rectifier is again assumed to be incorporated into the lighting driver 46.

When transistor M1 is on, the current is bypassed, and when transistor M1 is off during a negative half cycle (i.e., the current flows from the right end 16b to the left end 16a), the current flows via D8 charging the voltage supply buffer capacitor C2. The duty cycle of the MOSFET is controlled based on the sensed VDD amplitude.

The circuit is synchronized to the input high frequency current via capacitor C3.

The circuit associated with the transistor M1 functions as the voltage source 80, and the RC circuit R6, C1 and gate resistor R5 are shown.

During start up, a current flowing through a charging capacitor C4 charges the buffer capacitor C2. Once the low supply voltage VDD exceeds a threshold, it is provided to the relay coil via a switch, so that the relay turns on.

The low voltage supply VDD is connected to the gate of the triac via a resistor-diode circuit R7, D5 and a buffer capacitor C5. This is a rectifier circuit. Because the drain of M1 is switching between VDD and ground level, a DC voltage will be generated over capacitor C5. The voltage over C5 provides a negative gate current to the triac via gate resistor R5.

Figure 10:
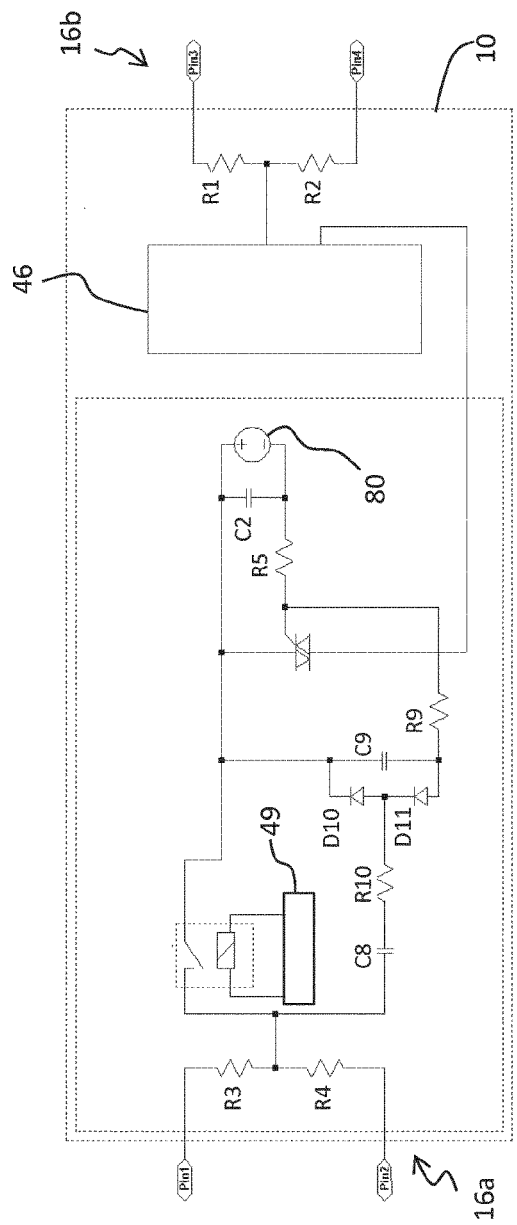
FIG. 10 shows a fifth example of pin safety arrangement.

The circuit may instead be implemented using a 3-Quadrant triac, for example as shown in FIG. 10. Compared with a 4-Quadrant triac, a 3-Quadrant triac has an advantage of lower required gate current. In order to trigger in all situations, the gate current needs to be a negative current (current flowing out of the gate).

The gate supply circuit again consists of two parts, namely a startup dv/dt supply and a steady state supply. A low voltage supply 80 is again generated by the circuit. It provides a voltage to the relay coil and to the gate of the triac in the steady state. As shown, the gate is connected to the negative node of the supply voltage through the gate resistor R5 so the gate current is negative.

The high frequency detection circuit is formed by the circuit C8, C9, R10, D10 and D11. When the relay is off, the high frequency voltage applied to the lamp causes a current to flow via C8. As a result, a DC voltage is generated over C9 (with the upper side positive). A negative current flows via the gate of the triac.

The amplitude is determined by the resistor R9. After the relay contact closes, the voltage over C9 collapses. In steady state the gate current is provided by the low voltage supply 80.

In the examples above, the safety circuit is entirely at the AC side of the rectifier.

Figure 11:
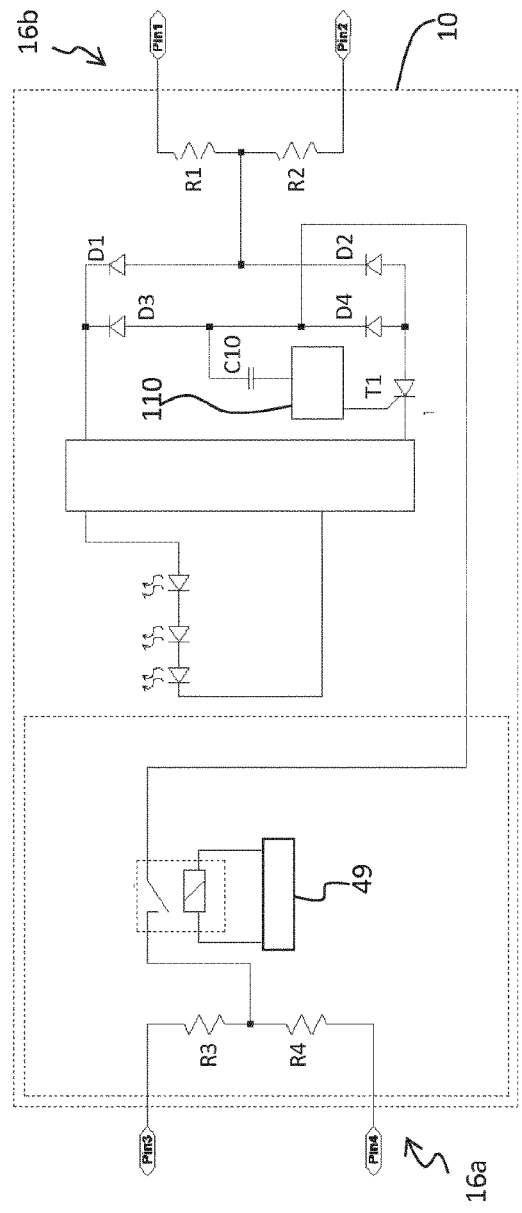
FIG. 11 shows a sixth example of pin safety arrangement.

FIG. 11 shows a variation in which the high voltage isolation barrier is after the rectifier on the DC side. It comprises an electronic switch in the form of thyristor T1 between an output of the rectifier and the lighting driver 46. The thyristor triggers when it detects a high frequency voltage at the input of the rectifier, and this is achieved by coupling the input to the rectifier to the thyristor gate control circuit 110 by means of capacitor C10.

Figure 12:
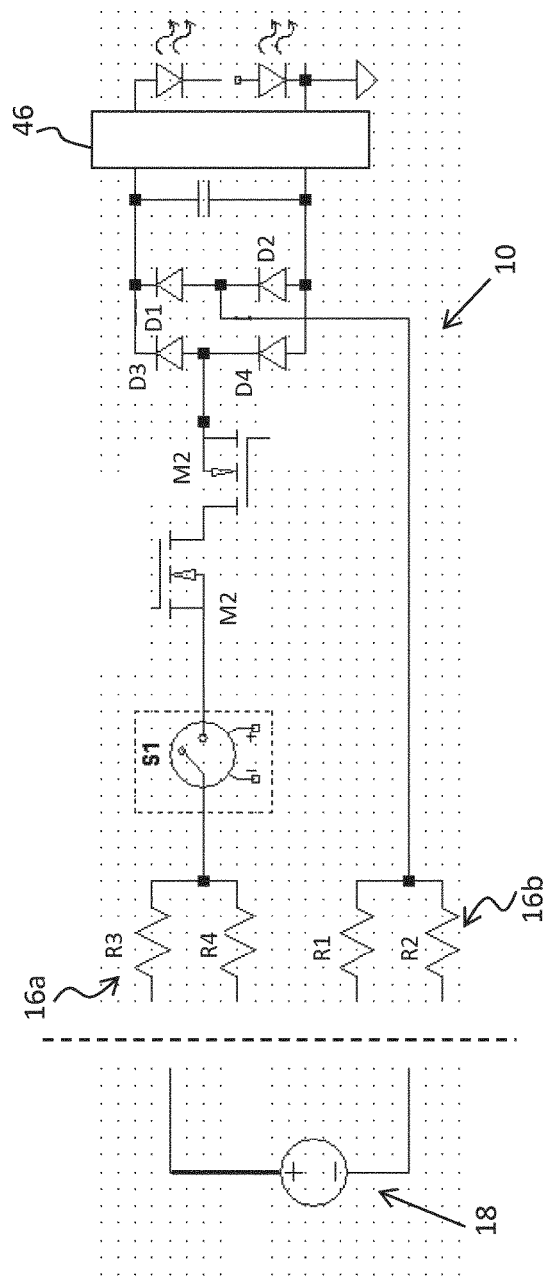
FIG. 12 shows a seventh example of pin safety arrangement.

FIG. 12 shows a variation in which the high voltage isolation barrier comprises an electronic switch in the form of a bidirectional pair of transistors M1, M2. MOSFETs are shown but other transistor types may be used such as BJTs. Drive circuits (not shown) are needed for the transistor gates.

Note that in all examples above, the compatibility with different ballast types may be improved by fine tuning the trigger voltage level of the high voltage isolation barrier.

The examples above provide two levels of protection between the ends of the lamp, so that even in the event of failure the main isolation switch, current limitation is provided. The examples above are all fully electrical so that no particular mechanical actuation functions need to take place.

Another aspect provides a device with a mechanical pin safety solution and in particular one which is more compatible with luminaires having an end-of-life protection function. A hybrid pin safety switch design is provided which combines a mechanical insertion detection switch and an electronic or electrical switch that is activated by the high frequency current.

Only when both the mechanical switch is activated and the high frequency signal is present will a current flow from one lamp end to the other lamp end.

Figure 13:
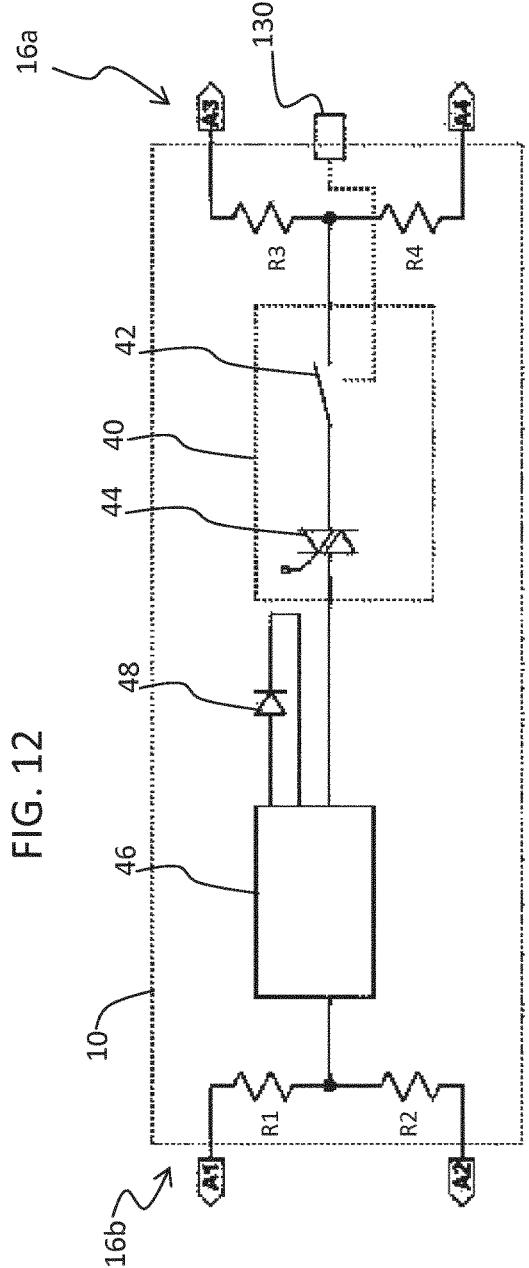
FIG. 13 shows an eighth example of pin safety arrangement.

FIG. 13 shows the design in simplified form. The isolation switch 42 again provides galvanic contact separation, but instead of being formed as an electrically controlled relay, it is formed as a mechanically actuated switch. The mechanical actuation is based on insertion detection as represented by detection unit 130. This is a mechanical switch actuator, for example a projecting pin which is depressed when the lamp is inserted into the luminaire. This happens automatically when the lamp is inserted, so that the user does not have to follow any particular insertion procedure.

The detection of the high frequency signal and electrical switching is carried out in the same way as explained above, for example using a triac 44 as shown in FIG. 13. For example, the gate trigger signal may be coupled by a capacitor to a high frequency voltage.

By using the combination of both the mechanical insertion detection switch and the triac, the high frequency electronic ballast will not activate the end-of-life ballast protection mode. In particular, directly after installation the electrical current may flow from the pins 16a at one lamp end to the pins 16b at the other lamp end. The filament emulation circuit (R1 to R4) is always present so no end-of-life situation is detected, and the triac will be fired by the high frequency signal.

Other electrical or electronic switches may be used instead of the triac, for example a MOSFET or a relay. A plurality of triacs may be used to block higher voltages (e.g. the transient voltage on the mains).

Figure 14:
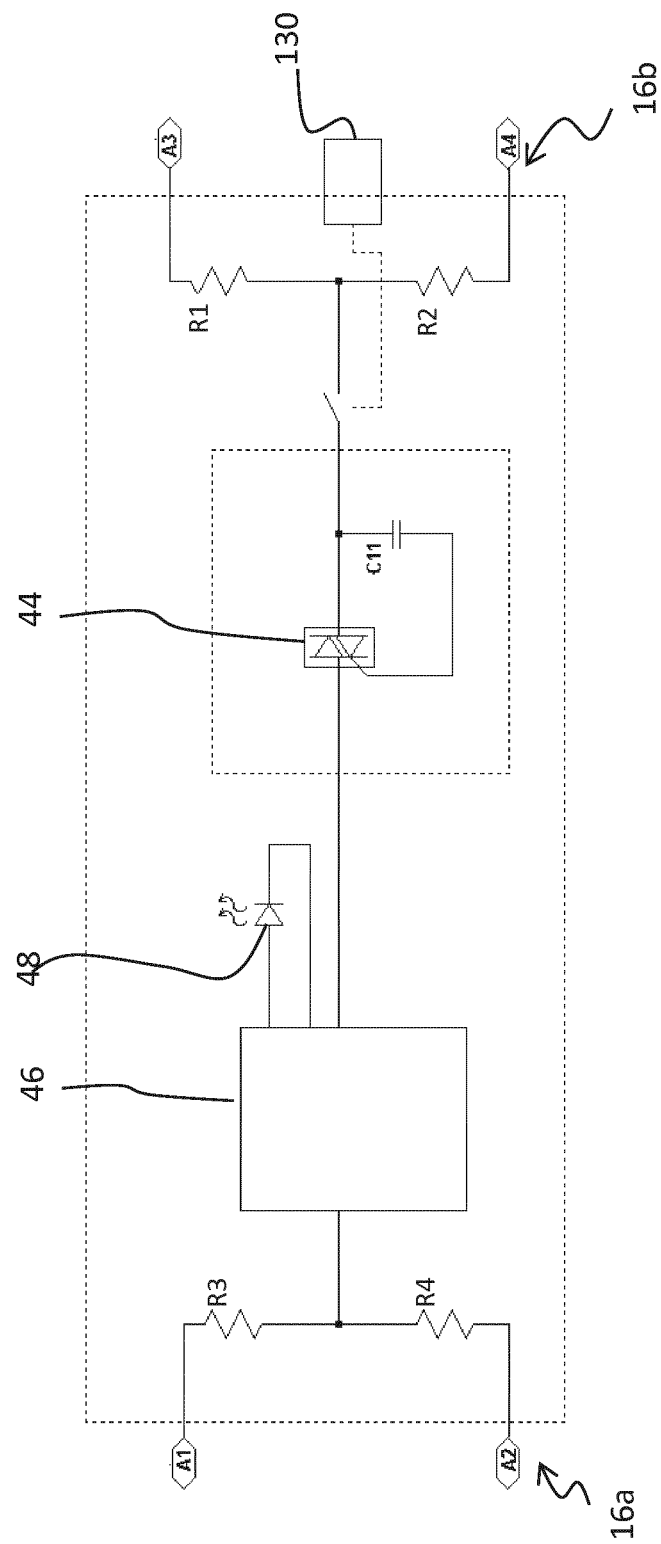
FIG. 14 shows a ninth example of pin safety arrangement.

FIG. 14 shows a simple way to trigger the triac. The gate of the triac is coupled to the triac load terminal (T2) via a capacitor C11. A suitable value for the capacitance is a few hundred picofarads (e.g. 470 pF). The capacitor senses the high frequency signal across the triac. Once the ballast starts up, a high frequency voltage is generated and applied across the triac T1 and T2 terminals. A current then flows to the gate terminal of the triac because the capacitor has lower impedance at high frequency. When there is no high frequency signal, the 50 Hz mains voltage leads to little current through the capacitor C11 because of the large huge impedance at 50 Hz. In that situation the triac remains in off mode and blocks the leakage current.

The circuit shown above is a simplest version. Additional components may be added to improve the performance of the triac circuit. For example, a capacitor and/or resistor can be placed in parallel between the gate and the T1 terminal of the triac to avoid false triggering. A resistor can be added in series with the capacitor C11 to limit the peak gate current.

The invention is of interest for high frequency ballast compatible LED tubes.

The LED arrangement may be a strip of LEDs on an internal printed circuit board, or there may be discrete surface mount LEDs. The housing has a transparent or partially transparent outer wall or outer wall portion. The driver circuit typically provides a current-regulated output to the LED arrangement.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A tubular solid state lighting device for receiving a high frequency signal, comprising:
a tubular housing having an elongate axis and first and second opposite ends, each end comprising two projecting electrical connection pins;
a safety circuit electrically coupled between connection pins of the first end and connection pins of the second end,
wherein the safety circuit comprises:
an electrically or mechanically controlled isolation switch providing a clearance distance;
a triac connected in series with the switch; and
a triac gate control circuit, wherein the triac gate control circuit comprises a high frequency detection startup circuit and wherein the high frequency detection startup circuit comprises an RC filter circuit for closing the triac when a high frequency voltage is present across terminals of the triac.

2. The tubular solid state lighting device as claimed in claim 1 further comprising:
a rectifier circuit, wherein the pins of the second end are electrically connected to the rectifier circuit;
a lighting driver circuit powered by the output of the rectifier circuit; and
a solid state lighting arrangement.

3. The tubular solid state lighting device as claimed in claim 1, wherein the pins of the first end are electrically connected to the safety circuit through a first filament emulation circuit comprising a series resistor arrangement, and the pins of the second end are electrically connected to the rectifier circuit through a second filament emulation circuit comprising a series resistor arrangement.

4. The tubular solid state lighting device as claimed in claim 1, wherein the electrically controlled isolation switch comprises an electrical relay.

5. The tubular solid state lighting device as claimed in claim 1, wherein the triac comprises a three or four quadrant triac.

6. The tubular solid state lighting device as claimed in claim 1, wherein the triac gate control circuit further comprises a voltage supply and a gate resistor.

7. The tubular solid state lighting device as claimed in claim 3, wherein the high voltage isolation barrier comprises a thyristor between the rectifier and the LED driver.

8. The tubular solid state lighting device as claimed in claim 1, wherein the solid state lighting arrangement comprises an LED arrangement and the lighting driver circuit comprises an LED driver.

9. A lighting fixture comprising:
an electronic fluorescent lighting ballast; and
the tubular solid state lighting device as claimed in claim 1 fitted to the fluorescent lighting ballast.

* * * * *